US008346794B2

(12) United States Patent  
Cheng et al.

(10) Patent No.: US 8,346,794 B2  
(45) Date of Patent: *Jan. 1, 2013

(54) METHOD AND APPARATUS FOR QUERYING TARGET DATABASES USING REFERENCE DATABASE RECORDS BY APPLYING A SET OF REFERENCE-BASED MAPPING RULES FOR MATCHING INPUT DATA QUERIES FROM ONE OF THE PLURALITY OF SOURCES

(75) Inventors: Kong Eng Cheng, Mendham, NJ (US); Munir Cochinwala, Far Hills, NJ (US); Dennis E. Egan, Westfield, NJ (US); Benjamin W. Falchuk, Upper Nyack, NY (US); Chiao-Wei Lee, Union, NJ (US); John R. Wullert, II, Martinsville, NJ (US)

(73) Assignee: TTI Inventions C LLC, Wilmington, DE (US)

( * ) Notice: Subject to any disclaimer, the term of this patent is extended or adjusted under 35 U.S.C. 154(b) by 101 days.

This patent is subject to a terminal disclaimer.

(21) Appl. No.: 12/849,522

(22) Filed: Aug. 3, 2010

(65) Prior Publication Data

US 2011/0047175 A1    Feb. 24, 2011

Related U.S. Application Data

(63) Continuation of application No. 10/828,575, filed on Apr. 21, 2004, now Pat. No. 7,788,278.

(51) Int. Cl.
*G06F 17/30* (2006.01)
(52) U.S. Cl. .................. 707/763; 707/769; 707/802
(58) Field of Classification Search .......... 707/609–611, 707/713, 718–719, 754, 763, 769, 791, 802, 707/765–766, 779, 796
See application file for complete search history.

(56) References Cited

U.S. PATENT DOCUMENTS 5,455,945 A    10/1995 VanderDrift
(Continued)

FOREIGN PATENT DOCUMENTS

CA    2436439 A1    2/2004
(Continued)

OTHER PUBLICATIONS

Qun Wei, Guolin Duan et al. "Mapping Technique of Step Data Model in Relational Database Based on Data Storage",2009 Second International Conference on Intelligent Networks and Intelligent Systems, pp. 657-660.*

(Continued)

*Primary Examiner* — Srirama Channavajjala
(74) *Attorney, Agent, or Firm* — Fitch, Even, Tabin & Flannery, LLP

(57) ABSTRACT

Input data queries directed at a plurality of target databases and originating from any of a plurality of sources are first converted to validated canonical forms, which are then used to query the target databases. Specifically, upon receiving an input data query, a relatively accurate reference database is selected based on the type of the input data. This reference is then queried for the input data with the intent of finding an exact matching record or a near-matching record that can be considered an exact match and thereby validating the input data. Otherwise, the requesting source is instructed to provide a new query. Once having a validated record, it is converted to a canonical form, which is then used to query the target databases intended to be searched. In a further embodiment, multiple reference databases are queried to determine a canonical form of the data or to determine multiple canonical forms of the data.

18 Claims, 2 Drawing Sheets

U.S. PATENT DOCUMENTS

| | | | |
|---|---|---|---|
| 5,511,186 | A | 4/1996 | Carhart et al. |
| 5,592,667 | A | 1/1997 | Bugajski |
| 5,819,291 | A * | 10/1998 | Haimowitz et al. ............... 1/1 |
| 5,862,325 | A | 1/1999 | Reed et al. |
| 5,966,695 | A | 10/1999 | Melchione et al. |
| 5,966,717 | A * | 10/1999 | Sass ............................... 1/1 |
| 5,991,758 | A * | 11/1999 | Ellard ............................. 1/1 |
| 6,389,414 | B1 * | 5/2002 | Delo et al. ....................... 1/1 |
| 6,389,429 | B1 * | 5/2002 | Kane et al. ................. 707/609 |
| 6,496,838 | B1 * | 12/2002 | Zamora-McKelvy et al. ............................ 707/640 |
| 6,636,850 | B2 * | 10/2003 | Lepien ....................... 707/780 |
| 6,745,209 | B2 | 6/2004 | Holenstein et al. |
| 6,785,689 | B1 * | 8/2004 | Daniel et al. ............... 707/754 |
| 6,826,568 | B2 * | 11/2004 | Bernstein et al. ........... 707/749 |
| 7,272,833 | B2 | 9/2007 | Yaung |
| 7,287,002 | B1 | 10/2007 | Asher et al. |
| 7,788,278 | B2 * | 8/2010 | Cheng et al. ................ 707/769 |
| 2002/0087552 | A1 | 7/2002 | Applewhite et al. |
| 2002/0161757 | A1 | 10/2002 | Mock et al. |
| 2003/0120651 | A1 * | 6/2003 | Bernstein et al. ................ 707/6 |
| 2003/0177118 | A1 | 9/2003 | Moon et al. |
| 2003/0195888 | A1 * | 10/2003 | Croft et al. ...................... 707/10 |
| 2003/0217031 | A1 | 11/2003 | Owen et al. |
| 2003/0220920 | A1 * | 11/2003 | Lake et al. ...................... 707/6 |
| 2004/0034615 | A1 | 2/2004 | Thompson et al. |
| 2004/0078386 | A1 | 4/2004 | Moon et al. |
| 2004/0088283 | A1 | 5/2004 | Lissar et al. |
| 2004/0133591 | A1 * | 7/2004 | Holenstein et al. ........... 707/102 |
| 2004/0267818 | A1 | 12/2004 | Hartenstine |
| 2005/0114311 | A1 * | 5/2005 | Cheng et al. ..................... 707/3 |
| 2006/0288032 | A1 * | 12/2006 | Harris et al. ................. 707/101 |
| 2007/0005543 | A1 * | 1/2007 | Furst et al. ..................... 706/47 |
| 2007/0179939 | A1 * | 8/2007 | O'Neil et al. ..................... 707/4 |
| 2009/0024639 | A1 * | 1/2009 | Steinmann .................. 707/100 |
| 2009/0037488 | A1 * | 2/2009 | Abrams ........................ 707/201 |

FOREIGN PATENT DOCUMENTS

| | | |
|---|---|---|
| JP | 03-286259 A1 | 12/1991 |
| JP | 06-067867 A1 | 3/1994 |
| JP | 08-153108 A1 | 6/1996 |
| JP | 09-091293 A1 | 4/1997 |
| JP | 10-240739 A1 | 9/1998 |
| WO | WO 95/03586 * | 2/1995 |
| WO | 9849632 A1 | 11/1998 |
| WO | 0129780 A1 | 4/2001 |
| WO | 02/33587 A1 | 4/2002 |
| WO | WO 02/33587 * | 4/2002 |
| WO | 02/095676 A1 | 11/2002 |
| WO | WO 01/09051 * | 11/2011 |

OTHER PUBLICATIONS

Ayla Sayli et al. "A Fast Transformation Method to Semantic Query Optimisation", 1997 IEEE, pp. 319-326.*

PCT Written Opinion of the International Searching Authority for International Application No. PCT/US05/09860 dated Sep. 19, 1997; 3 pages.

PCT International Search Report of the International Searching Authority for International Application No. PCT/US05109860 dated Sep. 19, 2007; 3 pages.

Japanese Patent Office Official Notice of Rejection mailed Sep. 4, 2009 for Japanese Patent Application No. 2007-509480; 15 pages.

Domingo-Ferrer et al. "Validating Distance-Based Record Linkage with Probabilistic Record Linkage", M.T. Escrig Monferrer and F. Toledo Lobo (Eds.): CCIA 2002, LNAI 2504, pp. 2007-215, 2002. c_Springer-Verlag Berlin Heidelberg 2002.

Japanese Patent Office Official Notice of Rejection mailed Apr. 30, 2010 for Japanese Patent Application No. 2007-509480; 17 pages.

Supplementary European Search Report from related EP Application No. 05730343; dated Nov. 29, 2011; 3 pages.

Communication pursuant to Article 94(3) EPCt from related EP Application No. 05730343.0; dated May 11, 2012; 7 pages.

Office Action from U.S. Appl. No. 10/595,379; dated Jul. 28, 2008; 17 pages.

* cited by examiner

METHOD AND APPARATUS FOR QUERYING TARGET DATABASES USING REFERENCE DATABASE RECORDS BY APPLYING A SET OF REFERENCE-BASED MAPPING RULES FOR MATCHING INPUT DATA QUERIES FROM ONE OF THE PLURALITY OF SOURCES

CROSS-REFERENCE TO RELATED APPLICATION

This application is a continuation of prior application Ser. No. 10/828,575, filed Apr. 21, 2004, which issued as U.S. Pat. No. 7,788,278 on Aug. 31, 2010 and is hereby incorporated herein by reference in its entirety.

FIELD

Our invention relates generally to database accesses. More particularly, our invention relates to methods and apparatus for querying one or more of a plurality of target databases with input data from any of a plurality of requesting sources.

BACKGROUND

Many computing systems and end-users today need to interact with numerous different target databases in order to extract needed information. The input data these computing systems and end-users use to access these target databases is often diverse. In general, it is necessary to map this diverse input data from the varying sources to the target database entries in order to extract information. However, inconsistencies between the various input data and the various database entries often make this task difficult.

In particular, various target databases often contain errors, imperfections, and inconsistencies (such as incomplete, ambiguous, and incorrect entries) among themselves and each other. Similarly, the various input data sources (whether computing systems or end-users) often also contain errors/imperfections and inconsistencies among themselves and each other. In general, the errors and inconsistencies across the target databases and input data can be small (e.g., the database lists the full word "street" while the input data uses the abbreviation "St.") or more major (e.g., all entries in the database refer to "Route 1" and the input data is entered as an alternative name, "Main St."). However, despite the degree of the errors/inconsistencies, it is still necessary and often critical to be able to determine a match between the databases and input data.

As an example of this problem, assume a user is searching for information about a building at a particular street address in order to identify any issues that might affect the value of the property. Relevant information could lie in county and town real-estate records, in state and federal tax records, in mortgage records across one or more financial entities, in newspaper archives, etc. Assume further there is an Internet-based service, for example, that can search these multiple sources on behalf of the user and return all relevant information based on the input address of the property. However, each of the target databases corresponding to these entities potentially has its own way of representing addresses. For example, the county records might maintain addresses in an abbreviated way because the records rely on block and lot numbers for accurate identification. The state records might be stored in an early computing system that is limited in the number of characters used to represent street names. The financial records might be widely inconsistent in how they represent street names and indicators because different users entered the data and have different preferences. In addition, all of these databases are likely to contain records with data entry errors, such as typographical or spelling mistakes. Overall, there is a strong possibility that the service will have a difficult time successfully matching an input address entered by the user with each of the various databases.

Overcoming such mapping issues and finding a match between possibly erroneous/imperfect input data from a variety of sources and an entry in multiple different databases can be an onerous task. More specifically, assume there are "M" different sources for input data, each of which has its own characteristic type of variations/inconsistencies and errors. For example, input data sources can include databases, data obtained via user interface applications, data collected by customer service representatives during a phone conversation, transcribed hand-written notes, voice-recognition output, etc. Assume further there are "N" different target databases that can be searched for any given input data request from any of the "M" sources. For example, in addition to the above property search example, a computing system may need to access customer records from different service providers, consumer data from different marketing firms, legal data from different jurisdictions, etc. Again, each of these "N" databases will have its own characteristic variations/inconsistencies and errors. In order to map input data from any of the "M" input sources to any of the "N" target databases involves defining a set of rules for mapping each source to each target. Because of the errors/inconsistencies of any given input source and any given database, the complexity of any of these sets of rules can be high, leading to difficulty in defining the rules and leading to excessive processing for any given query especially if this query is across multiple target databases. As significant, the total number of rules that needs to be defined is on the order of "M×N" sets of rules. Making this situation worse, it is possible that the rules will need to be field specific so that "M×N" sets of rules will need to be defined for each field. The possibly high value of the "M×N" product is an indication of the difficulty of trying to perform the direct mapping between multiple input sources and the entries of one or more target databases.

There are several existing approaches for overcoming the above-described mapping problem. One approach is to limit the interaction with a target database to a specific set of choices, thereby limiting the manner in which data is expressed. For example, pull-down boxes could be used to enter data into a database system and to specify input data when doing a search. This approach reduces errors and inconsistencies within the database and between the database and input data. However, this approach does not allow for free-form flexibility and is only feasible when the number of possible values for a given database entry are limited to a number that does not result in a list that is daunting to users.

A second approach is to define multiple sets of rules to perform dynamic mappings between the various input data sources and the multiple target database variations. As described above, this approach involves defining "M×N" sets of rules for mapping the various input data sources to each target variation, taking into account all possible errors and inconsistencies. While this approach allows for free-form flexibility, it is an onerous task if the number of variations in the target databases and/or input data sources is large. In addition, given the possible complexity of the rules, this method leads to more processing for any given query.

A third approach is to "cleanse" the data across the multiple databases using "cleansing rules" and thereby removing entry errors and creating consistency both within and across the databases (e.g., all address entries within the databases are cleansed to use the full word "street"). A computing system could then use these "cleansing rules" on the input data prior to accessing the databases so that the input data is now consistent with the database entries. Alternatively, the computing system could utilize a single set of rules that map the more free-form input data to the data representation that is now common across the multiple target databases. In general, this third approach is well suited for situations where the target databases are commonly controlled/owned and where the target data across the multiple databases is static. However, if the target data across the multiple databases is dynamic, the database information would have to be cleansed continuously in order to handle updates to the data. This presents a problem of consistency.

Although the second and third approaches address the matching issue and allow for free-form flexibility with respect to the input data and database entries, they also have the additional problems with respect to partial matches. Specifically, when defining rules for matching as in the second and third approaches, it is also possible to define rules that detect matches that are not exact (i.e., partial mapping rules). For example, a partial match might involve accepting all records that match those inputs that contain common misspellings or typographical errors (e.g., "Mian Street" is equivalent to "Main Street"). Partial mapping offers the advantage of possibly identifying intended records that might be hidden by data entry errors. However, it also has the disadvantage of potentially identifying items that are not matches at all. If either the input or target data can be presumed to be correct, the probability of such mismatches is likely to be low. However, in cases where the possibility of error exists in both the input and the target data, the probability of mismatches is substantially higher.

SUMMARY

Accordingly, it is desirable to provide methods and systems that overcome the shortcomings of the prior art and reduce the number and complexity of rules for accessing any of a plurality of target databases from any of a plurality of sources while also improving the efficiency and reliability of these database accesses. In accordance with methods of our invention, prior to querying a target database(s) with input data from a requesting source, the input data is first compared to a reference database using a set of "reference-based mapping rules." This reference database is relatively static and is presumed to be cleansed, thereby making the reference database more accurate than the actual target databases (note that the cleansing of the reference databases is a process that occurs outside the scope of our invention and our invention presumes that the reference databases have been priorly cleansed). Accordingly, the intent of matching the input data to this relatively accurate reference source is to validate the input data and to ensure it is complete, non-ambiguous, and correct/free of errors.

More specifically, this step of our invention for querying the reference database will either produce an exact matching record (thereby validating the input data) or no matching records (requiring the requesting source—i.e., an end-user, a computing system, etc.—to make a new request). Alternatively, in accordance with a further embodiment of our invention, this step may also produce one or more possibly matching records. Assuming possibly matching records are found and no exact matching record is found, a determination is made as to whether one of the possibly matching records is "close enough" to be considered an exact match to the input data and if so, our method proceeds with this record. If none of the possibly matching records is "close enough" to be considered an exact match, the requesting source is requested to make a new query. As a further alternative, when possibly matching records are found and none can be considered "close enough," these possibly matching records are returned to the requesting source asking the source to select the record that matches the input, assuming such a record is present. Otherwise, the requesting source is instructed to make a new query.

Once a matching record to the input data is found or selected, the input data is considered source validated and this matching record is now used for the actual target database queries. More specifically, using a set of "transformation rules", this matching record is next transformed into a canonical form, which is a simplified and standardized format that represents the full information present in the original input data but is possibly easier to match to each of the target databases to be searched than the reference database record. Alternatively, the "transformation rules" may be as simple as using the format of the reference database (in which case no actual transformation takes place). Preferably, however, the "transformation rules" are used to convert the matching record into multiple canonical forms, each form corresponding to and being consistent with the entries of an associated target database to be searched. Regardless, the resulting canonical form or forms of the input data are then compared to the data entries of the one or more target databases using "target-based query rules." The resulting matching records from the queries are then returned to the requesting source.

Assuming there are "M" different sources for input data and "C" reference databases, the "reference-based mapping rules" will comprise "M×C" sets of rules for accessing the reference database. Similarly, assuming there are "N" different expressions/forms of the data entries used across "N" different databases, the validated and standardized canonical form of the input data allows for the "target-based query rules" to consist of only "N" sets of rules. Similarly, whether converting the matching record to a single canonical form or to multiple canonical forms, the "transformation rules," at worse case, are on the order of "N" sets of rules. As a result, our multi-stage method for any of "M" requesting sources to query any of "N" target databases is on the order of "(M×C)+N" sets of rules (or "(M×C)+2N" sets of rules when considering the transformation rules), rather than the "M×N" sets of rules of the prior art for mapping all input data forms to all target database entry forms. Because the number of reference databases, "C", will typically be small as compared to "M" and "N" and often may even be limited to one, our method for querying target databases from any of a plurality of sources significantly simplifies the number of rules that needs to be defined (i.e., "(M×C)+N" will typically be less than "M×N"). As important, whether considering "(M×C)+N" or "(M×C)+2N" sets of rules, the reduced number of rules as compared to the prior art leads to reduced processing of any given query, thereby making our database querying method more efficient than the prior art.

Our method also has several additional advantages over the prior art. First, because the input data has been validated, when a target database search produces no resulting records there is a higher confidence that the target database does not contain the desired information. Second, similar to the prior art, our method supports partial matching rules when accessing the reference and target databases. However, when accessing the reference and target databases, our method reduces the potential of identifying database records that are not actually matches because the reference databases are presumed to be correct during the reference database accesses and the canonical form of the input data is presumed to be correct during the target database accesses. Third, the standardized canonical form of the input data allows for simplified target database searches because unnecessary portions of the original input data can be easily removed and further allows for more efficient target database searches because the original input data can be easily separated and prioritized into component pieces and then each piece used to search a target database in a hierarchical fashion.

In accordance with a second embodiment of our invention, multiple reference databases, rather than one reference database, are selected and accessed in order to validate the input data. These multiple reference databases can be used in several alternative ways including searching the databases in a sequential fashion for an exact matching record or possibly matching records, searching the databases in parallel for all exact matching and possibly matching records (and then using one of these records), and using the databases in a hierarchical fashion to validate the input data in pieces.

Finally, in accordance with a third embodiment of our invention, multiple canonical forms of the input are used to query each target database intended to be searched. In particular, in some cases it may be beneficial to provide redundancy and error checking to overcome any errors that may occur when mapping the input data to a canonical form. The multiple canonical forms can be obtained, for example, by querying a single reference database and then expressing the resulting record in multiple forms or by querying multiple reference databases and using each resulting record as a canonical form of the input data.

DETAILED DESCRIPTION

Figure 1:
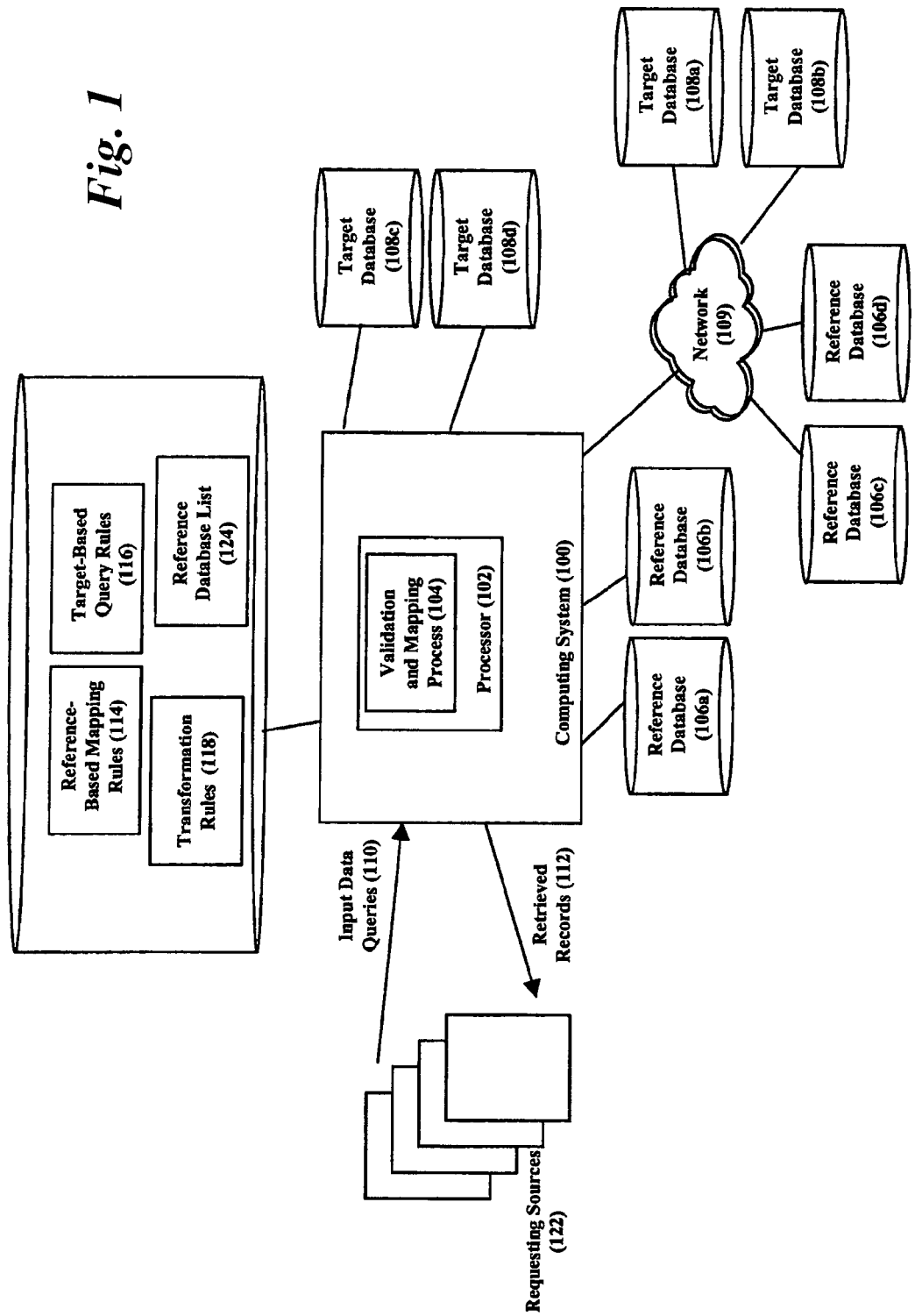
FIG. 1 is an illustrative architecture of a computing system for executing methods in accordance with embodiments of our invention.

FIG. 1 is a high level architecture of a computing system 100 for executing methods in accordance with embodiments of our invention. Computing system 100 comprises a processor 102 for executing the methods of our invention, which methods execute as "validation and mapping process" 104. The validating and mapping process 104 has access to one or more reference databases 106a-d and a plurality of target databases 108a-d. The reference and target databases can be co-located and part of computing system 100 (such as databases 106a-b and 108c-d) or can be external to the computing system and accessible via a network 109 (such as databases 106c-d and 108a-b). The validating and mapping process 104 receives input data queries 110 from a plurality of requesting sources 122, wherein the input data queries 110 are directed at one or more of the target databases 108. The requesting sources 122 are external to the computing system (for example, external end-users and external systems accessing computing system 100 through a network interface) and/or are local to the computing system 100 (for example, end-users directly accessing computing system 100 or local applications executing on the system). Similarly, once retrieving records from the target databases 108, the validating and mapping process 104 transfers the retrieved records 112 to the requesting sources 122. Computing system 100 also comprises a database of "reference-based mapping rules" 114 for accessing the reference databases 106 and of "target-based query rules" 116 for accessing the target databases 108. Computing system 100 further comprises a "list of reference databases" 124 for selecting a reference database 106. Optionally, computing system 100 also comprises "transformation rules" 118, which are further described below.

Figure 2:
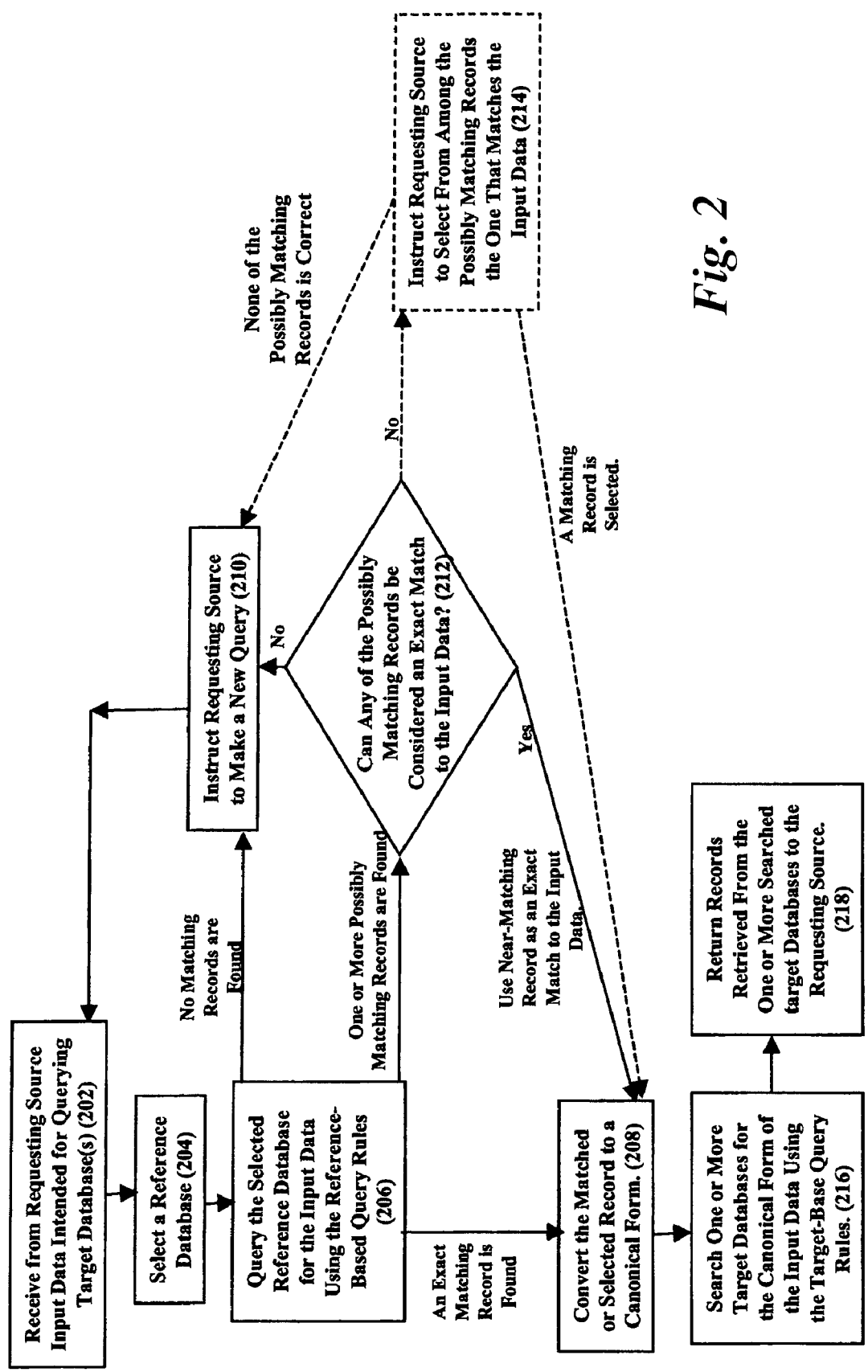
FIG. 2 depicts the method steps of one illustrative embodiment of our invention for querying one or more of a plurality of target databases with input data from any of a plurality of requesting sources.

FIG. 2 is a flow chart depicting a first embodiment of the method steps of our invention for querying one or more of the plurality of target databases 108 with input data queries 110 from any of the plurality of requesting sources 122. In particular, upon receiving an input data query from a requesting source 122 (step 202), the input data is first validated to ensure it is complete, non-ambiguous, and correct/free of errors. Specifically, in step 204 a reference database 106 is first selected based on the type of input data. A reference database is a database that is presumed to be relatively static and has been carefully cleansed thereby making the reference database relatively accurate as compared to the target databases 108. (Note that the cleansing of the reference databases is a process that occurs outside the scope of our invention and the method steps of FIG. 2 presume this cleansing has already occurred. Note further that while the cleansing process may be processor intensive, the results of the cleansing can be attributed across many end-users/target-database-accesses performed in accordance with our invention, thereby making the cost per database-access small.) Accordingly, computing system 100 can maintain a list of reference databases 124 and the type of data each reference is capable of validating. Based on the data type of the input data, validation and mapping process 104 will choose from among the reference databases. Again, using the street address example, a reference database can include a commercial street address guide, a mapping and geographic information database, or a public records database such as those the postal service provides. Here, based on the type of property description the input data provides, one of these address-based reference databases will be selected.

Once having a reference database, this database is queried in step 206 with the input data using the set of "reference-based mapping rules" 114. Note that these mapping rules 114 are not specific to our invention and will depend less on the exact data itself and more on the general format of the input data and the common errors in this data (both of which the source of the input data affects). Nonetheless, assuming there are "M" different sources for input data and "C" reference databases 106, the "reference-based mapping rules" 114 will comprise "M×C" sets of rules for accessing the reference databases 106. Note also that each type of input data may have its own set of rules. Importantly, note that because the reference databases 106 are cleansed and presumed accurate, each of the "M×C" sets of rules that comprises the "reference-based mapping rules" 114 is simplified as compared to the prior art matching rules.

The "reference-based mapping rules" 114 are defined such that upon querying a reference database, either an exact matching record to the input data will be found and selected (thereby validating the input data) or no matching records will be found. In addition, rules 114 are preferably defined to also include partial mapping rules such that the database query will also result in one or more possibly matching records being found. Accordingly, assuming a matching record is found, the input data is presumed validated and our method proceeds from step 206 to step 208. Similarly, assuming no matching record is found, the method proceeds from step 206 to step 210 where the requesting source is instructed to make a new query. However, assuming the rules 114 include partial mapping rules, if an exact match is not found but one or more possibly matching records are found, the method proceeds from step 206 to step 212 where a determination is made (based on the "reference-based mapping rules" 114) as to whether one of these possibly matching records can be deemed "close enough" to the input data to be considered an exact match. If such a record is found, the method proceeds from step 212 to step 208 using the selected near-matching record as if it were an exact match. However, if no record from among the possibly matching records can be considered an exact match, the method proceeds from step 212 to step 210 where the requesting source (i.e., end-user or computing system) is instructed to make a new query.

As an alternative to proceeding from step 212 to step 210 when no record from among the possibly matching records can be considered an exact match, the method may proceed from step 212 to step 214 where the set of possibly matching records are returned to the input data source 122 requesting that source to select the record that matches the input data. If the requesting source indicates that none of the possibly matching records matches the input data, the method proceeds to step 210 where the requesting source is again requested to make a new query. If, however, the requesting source identifies a matching record, this record is now used as the validated input data and the method proceeds from step 214 to step 208. Note again that the "reference-based mapping rules" 114 do not need to include partial-mapping rules (i.e., steps 212 and 214) but preferably include such rules. Nonetheless, it should be noted that when such rules are included, because the reference database is presumed cleansed and accurate, when given a query our invention produces fewer "possibly matching records" that definitely do not match the query, as compared to the prior art.

Turning to step 208, once a matching record is found or selected, this record is converted to a canonical form, which is a simplified and standardized format that represents the full information present in the input data. The conversion to canonical form can be based on a set of rules, referred to as the "transformation rules" 118. These rules may be as simple as using the format of the reference database (in which case no actual transformation takes place). Alternatively, these rules can define a set of processing steps to convert the reference database record into a single canonical format that is easier to match to each of the target databases. Preferably, however, the rules define a set of processing steps to convert the reference database record into multiple canonical forms, each form corresponding to and being consistent with the entries of an associated target database to be searched. In other words, for each specific target database to be searched, the matching record is converted to a canonical form that matches the individual format rules of that database, resulting in several canonical forms. Importantly, corresponding the canonical form to each target database increases the likelihood that a match will be found.

In general, the "transformation rules" 118 for performing the conversion from the matching record to the canonical form(s) can be implemented by analyzing the reference database record, looking for specific features specified in the rules, and making changes when such features are found. For example, the reference database may spell out "Street" or "Avenue," but it is known that the target database uses the abbreviations: "St." for "Street" and "Ave." for "Avenue." In this case, it is advantageous for the transformation rules to specify that "Street" should be replaced with "St." and that "Avenue" should be replaced with "Ave." Significantly, whether converting the matching record to a single canonical form or to multiple canonical forms, the "transformation rules", at worse case, are on the order of "N" sets of rules, assuming there are "N" different expressions/forms of the data entries used across "N" different databases. Importantly, note that by having the original input data in a cleansed format (i.e., the reference database record form), the conversion to canonical form for one or more target databases is simplified. As important, whether one or more canonical forms is produced, at this point, the input data is validated and is in a standardized form.

Proceeding to step 216, once having the canonical form of the input data, one or more of the target databases 108 are selected and searched for the canonical form of the input data using the set of "target-based query rules" 116 (the exact number of target databases and which databases are searched are based on the requesting source's initial search request). Based on the results of this search, the retrieved records are returned to the requesting source in step 218.

Again, note that the "target-based query rules" 116 are not specific to our invention and will depend less on the specific content of the exact data being searched for and more on the target database and general format of the target database entries being searched. Nonetheless, assuming there are "N" different expressions/forms of the data entries used across "N" different databases, the validated and standardized canonical form of the input data allows for the "target-based query rules" 116 to consist of only "N" sets of rules. (Note also that the canonical form of each input data type may have its own set of rules.) In addition, because of the validated and standardized canonical form of the input data, the "N" sets of rules themselves that comprise the "target-based query rules" are simplified as compared to the prior art matching rules. Overall, our multi-stage method for allowing any of a plurality of "M" requesting sources 122 to query any of "N" target databases 108 is on the order of "(M×C)+N" sets of rules (or "(M×C)+2N" sets of rules when considering the "transformation rules" 118), rather than the "M×N" sets of rules of the prior art for mapping all input data forms to all target database entry forms. Because the number of reference databases, "C", will typically be small as compared to "M" and "N" and often may even be limited to one, our method for querying target databases from any of a plurality of sources significantly simplifies the number of rules that needs to be defined (i.e., "(M×C)+N" will typically be less than "M×N"). As important, whether considering "(M×C)+N" or "(M×C)+2N" sets of rules, the reduced number of rules as compared to the prior art leads to reduced processing of any given query, thereby making our database querying method more efficient than the prior art.

In addition to the increased efficiency and the simplified rules of our invention, the validated and standardized canonical form of the input data has several additional advantages with respect to the "target-based query rules" 116 and how the target database queries are performed in step 216. First, because the input data has been validated, when a target database search produces no resulting records there is a higher confidence that the target database does not contain the desired information. Second, the "target-based query rules" 116 preferably include partial-mapping rules. However, because the validated and standardized canonical form of the input data is used to perform the target database queries, our invention reduces the possibility of the partial mapping rules identifying records that are not matches at all, unlike the prior art.

Similarly, one way to improve partial mapping rules is to include distance metrics. For example, entries that differ in only one or two character positions might be considered to be matches or near matches. In addition, weightings can be set on these distance metrics to compensate for probable errors specific to each target database (e.g., weighting based on the "QWERTY" keyboard for typed data, weighting based on the appearance of characters for optically-scanned textual data, and weighting based on phonetics for speech recognition). However, note than when the possibility of error not only exists in the databases but also exists in the input data, as with the prior art, there is a strong possibility these techniques will produce mismatches. Because our invention pre-validates the input data thereby removing any errors, distance metrics are more easily integrated into any partial-mapping rules of the "target-based query rules" 116 because there is less concern that mismatches will occur. Note also that because the reference databases are cleansed and accurate, distance metrics are also easier to integrate into any partial-mapping rules of the "reference-based query rules" 116.

A third advantage of the standardized canonical form of the input data of our invention is that it is not necessary to use the entire form of the input data to perform the target database queries. Specifically, because the canonical form is in a standardized format, unnecessary portions of the original input data can be easily removed thereby simplifying the target database searches. Similarly, the canonical form of the input data also has a significant advantage in that the canonical form can now contain additional information beyond the original input data. This additional information can be used to enhance or enable the subsequent queries. For example, returning to the property search example from earlier, assume that the reference database 106 searched in step 206 results in a record that includes not only address information but also latitude and longitude information. As a result, the canonical form of the input data contains additional information over the original input data. The "target-based query rules" 116 can specify that this latitude and longitude information should be used to query target databases that contain such information but do not contain street address information. Similarly, the "target-based query rules" 116 can specify that the address information should be used to query target databases that contain such information but do not contain latitude/longitude information. Because of the standardized canonical form of the input data, the latitude and longitude information and/or address information is easily removed from the target database queries as needed. As a result, the number of target databases that can be searched in accordance with our invention is broader than the original input data would have allowed.

Reference will now be made to several alternative embodiments of our invention. Specifically, in accordance with a second embodiment of our invention, in step 204 multiple reference databases 106 (rather than one) are selected based on the type of input data. Once selected, the multiple reference databases can be subsequently used in one of several alternative ways in step 206 for validating the input data. As a first alternative, the multiple reference databases can be queried sequentially until either an exact matching record is found (in which case the method proceeds to step 208) or no matching records are found (in which case the method proceeds to step 210). Alternatively, the "reference-based mapping rules" 114 preferably also include partial mapping rules such that the sequential queries also result in one or more possibly near-matching records being found. When such near-matching records are collected and no matching record is found, the method proceeds to step 212 where a determination is made as to whether one of these near-matching records from among the multiple reference databases can be deemed "close enough" to the input data to be considered an exact match. In general, how a near-matching record is selected from among the multiple reference databases is not specific to our invention. One mechanism is to weight/prioritize the reference databases and to select the near-marching record from the highest priority database that produced a near-matching record. Another possible mechanism/consideration is whether a quorum is achieved among the reference databases (i.e., if a quorum of the queried databases produces the same "possibly matching record" use this record as the exact match). Nonetheless, from step 212 the method then continues as described above, proceeding to step 208 if a near-matching record is selected as an exact match, or either proceeding to step 210 where the requesting source is instructed to make a new query or alternatively proceeding to step 214 where the requesting source is provided a set of possible records to choose from.

As a second alternative regarding multiple reference databases, the selected reference databases can be searched in parallel, now collecting all matching records and, preferably, all possibly matching records. Again, if one or more matching records are found, one of these records is selected and the method proceeds to step 208. If no records are found the method proceeds to step 210. If no exact matching records are found but one or more possibly near-matching records are found, the method proceeds to step 212 where a determination is made as to whether one of these near-matching records can be considered an exact match. Again, a prioritization method/quorum method/etc. can be used to select a near-matching record as an exact match. The method then proceeds as described above.

As a third alternative, the multiple selected reference databases can be used for a multi-stage validation where the input data is parsed and validated in pieces. For example, again assuming that the input data is a property-address, in a first pass a zip-code reference database can be queried to validate the zip-code. Once validated, the zip-code can be combined with the street address and used together to query a street address database, etc.

In accordance with a third embodiment of our invention, multiple canonical forms of the input data are used to search each target database (i.e., each target database is searched multiple times, each time using a different canonical form of the input data). The multiple canonical forms of the input data can be obtained in several ways. For example, a single reference database can be queried in step 206 and the resulting record then expressed in different ways in step 208 based on the "transformation rules" 118. Alternatively, multiple reference databases can be queried in step 206 and each resulting record then used to generate a canonical form of the input data. For example, given an address as input data, a reference database of addresses can be queried to give an address-based canonical form of the input data and a reference database of latitudes/longitudes can be queried to give a latitude/longitude canonical form of the input data. Regardless, each of the canonical forms of the input data is then used in step 216 to search each intended target database 108 using the "target-based query rules" 116. In other words, each target database to be searched is queried multiple times, each time using one of the canonical forms of the input data (note that as described above, the same format for each canonical form of the input data can be used across all target databases or each canonical form of the input data can be tailored to each target database). The results of the multiple queries on a target database are then compared. If the resulting records from a given database match, the common result is returned to the requesting source. If the resulting records from the given database differ, the records are suspect. Here, all of the records from the multiple queries can be returned to the requesting source for further selection, a filtered subset of these records can be returned to the requesting source for further selection, or all records can be discarded as inaccurate. Accordingly, the advantage of this embodiment is that it in some cases, it may be beneficial to provide redundancy and error checking. Specifically, in some cases an error can occur when mapping the input data to the canonical form in steps 204-214. By mapping the input data to multiple separate canonical forms and then using each form to perform the target database queries, the odds of identical errors are reduced. If the resulting records from a given target database are the same, it is more likely that the mapping is correct.

The above-described embodiments of our invention are intended to be illustrative only. Numerous other embodiments may be devised by those skilled in the art without departing from the spirit and scope of our invention.

We claim:

1. A method of database querying, the method comprising:
receiving at a computing device an input data query from a requesting source of a plurality of requesting sources, wherein the input data query has input data and an input data type and wherein a first input data query from a first requesting source has a form different from a second input data query from a second requesting source;
querying by the computing device a reference database containing validated data, the reference database selected based on the input data type from among a plurality of reference databases, the querying comprising seeking a reference database record that matches the input data;
wherein the querying the reference database further comprises seeking a reference database record by applying a set of reference-based mapping rules for matching input data queries from one of the plurality of requesting sources to an associated one of the plurality of reference databases;
in response to finding a matching reference database record, applying at least one transformation rule to convert the matching reference database record to a plurality of forms, wherein individual ones of the plurality of forms correspond to individual target databases of a plurality of target databases, and querying by the computing device using at least one of the individual ones of the plurality of forms at least one of the plurality of target databases for one or more target database records that correspond to the reference database record; and
retrieving corresponding records comprising target database records that correspond to the reference database record and transferring the corresponding records from the computing device to the requesting source.

2. The method of claim 1 further comprising: in response to failing to find a matching reference database record but finding one or more possibly matching reference database records, determining whether a possibly matching record can be considered a near-matching record to the input data; and
in response to identifying a near-matching record, applying at least one transformation rule to convert the near-matching reference database record to a plurality of forms, wherein individual ones of the plurality of forms correspond to individual target databases of a plurality of target databases, and querying using at least one of the individual ones of the plurality of forms at least one of the plurality of target databases for the one or more target database records that correspond to the near-matching record.

3. The method of claim 1 further comprising:
in response to failing to find a matching reference database record but finding one or more possibly matching reference database records, determining whether a possibly matching record can be considered a near-matching record to the input data; and
in response to failing to identify a near-matching record, generating a selection request to choose from among the one or more possibly matching records a record that corresponds to the input data and in response to selection of a chosen record from among the one or more possibly matching records, applying at least one transformation rule to convert the chosen record to a plurality of forms, wherein individual ones of the plurality of forms correspond to individual target databases of a plurality of target databases, and querying using at least one of the individual ones of the plurality of forms at least one of the plurality of target databases for the one or more target database record that corresponds to the chosen record.

4. The method of claim 1 wherein the querying any of the plurality of target databases further comprises, in response to finding a matching reference database record, querying for records that possibly correspond to the reference database record.

5. The method of claim 1, wherein the applying at least one transformation rule comprises converting the matching reference database record to match individual format rules of at least one of the plurality of target databases.

6. A method of database querying, the method comprising:
receiving at a computing device an input data query from a requesting source of a plurality of requesting sources, wherein the input data query has input data and an input data type and wherein a first input data query from a first requesting source has a form different from a second input data query from a second requesting source;
querying by the computing device a reference database containing validated data, the reference database selected based on the input data type from among a plurality of reference databases, the querying comprising seeking a reference database record that matches the input data;
wherein the querying the reference database further comprises seeking a reference database record by applying a set of reference-based mapping rules for matching input data queries from one of the plurality of requesting sources to an associated one of the plurality of reference databases;
in response to failing to find a matching reference database record but finding one or more possibly matching reference database records, determining whether a possibly matching record can be considered a near-matching record to the input data;
in response to identifying a near-matching record, applying at least one transformation rule to convert the near-matching reference database record to a plurality of forms, wherein individual ones of the plurality of forms correspond to individual target databases of a plurality of target databases, and querying using at least one of the individual ones of the plurality of forms at least one of the plurality of target databases for the one or more target database records that correspond to the near-matching record; and
retrieving corresponding records comprising target database records that correspond to the near-matching record and transferring the corresponding records from the computing device to the requesting source.

7. A method of database querying, the method comprising:
receiving at a computing device an input data query from a requesting source of a plurality of requesting sources, wherein the input data query has input data and an input data type and wherein a first input data query from a first requesting source has a form different from a second input data query from a second requesting source;
querying by the computing device a reference database containing validated data, the reference database selected based on the input data type from among a plurality of reference databases, the querying comprising seeking a reference database record that matches the input data;
wherein the querying the reference database further comprises seeking a reference database record by applying a set of reference-based mapping rules for matching input data queries from one of the plurality of requesting sources to an associated one of the plurality of reference databases;
in response to failing to find a matching reference database record but finding one or more possibly matching reference database records, determining whether a possibly matching record can be considered a near-matching record to the input data;
in response to failing to identify a near-matching record, generating a selection request to choose from among the one or more possibly matching records a record that corresponds to the input data and in response to selection of a chosen record from among the one or more possibly matching records, applying at least one transformation rule to convert the chosen record to a plurality of forms, wherein individual ones of the plurality of forms correspond to individual target databases of a plurality of target databases, and querying using at least one of the individual ones of the plurality of forms at least one of the plurality of target databases for the one or more target database record that corresponds to the chosen record; and
retrieving corresponding records comprising target database records that correspond to the chosen record and transferring the corresponding records from the computing device to the requesting source.

8. A method of database querying, the method comprising:
receiving at a computing device an input data query from one of a plurality of requesting sources, wherein a first input data query from a first requesting source has a form different from a second input data query from a second requesting source;
querying by a computing device a reference database corresponding to a data type possessed by an input data query, the reference database being populated with database records comprising validated data associated with the data type;
wherein the querying the reference database further comprises seeking a reference database record by applying a set of reference-based mapping rules for matching input data queries from one of the plurality of requesting sources to an associated one of the plurality of reference databases;
in response to finding a matching reference database record, applying at least one transformation rule to convert the matching reference database record to a plurality of forms, wherein individual ones of the plurality of forms correspond to individual target databases of a plurality of target databases, and querying by the computing device using at least one of the individual ones of the plurality of forms at least one of a plurality of target databases for one or more target database records that correspond to the matching reference database record; and
retrieving those target database records that correspond to the individual ones of the plurality of forms.

9. The method of claim 8 wherein the querying a reference database comprises querying the reference database for reference database records that possibly match the input data query, the method further comprising:
in response to failing to find a matching reference database record but finding one or more possibly matching reference database records, determining whether a possibly matching record can be considered a near-matching record to the input data query; and
in response to identifying a near-matching record, applying at least one transformation rule to convert the near-matching reference database record to a plurality of forms, wherein individual ones of the plurality of forms correspond to individual target databases of a plurality of target databases, and querying using at least one of the individual ones of the plurality of forms at least one of the plurality of target databases for one or more target database records that correspond to the individual ones of the plurality of forms.

10. The method of claim 9 further comprising:
in response to failing to find a matching reference database record and finding one or more possibly matching reference database records but failing to identify a near-matching record, generating at the computing device a selection request to choose from among the one or more possibly matching records a record that corresponds to the input data query; and
in response to a possibly matching record that corresponds to the input data query and is chosen, applying at least one transformation rule to convert the chosen record to a plurality of forms, wherein individual ones of the plurality of forms correspond to individual target databases of a plurality of target databases, and querying at the computing device using at least one of the individual ones of the plurality of forms at least one of the plurality of target databases for the one or more target database records that correspond to the individual ones of the plurality of forms.

11. The method of claim 8, wherein the applying at least one transformation rule comprises converting the matching reference database record to match individual format rules of at least one of the plurality of target databases.

12. An apparatus for database querying, the apparatus comprising:
means for receiving an input data query from a requesting source from a plurality of requesting sources, wherein the input data query having input data and an input data type and wherein a first input data query from a first requesting source has a form different from a second input data query from a second requesting source;
means for querying a reference database containing validated data, the reference database selected based on the input data type from among a plurality of reference databases, the querying comprising seeking a reference database record that matches the input data;
wherein the means for querying further comprises means for seeking a reference database record by applying a set of reference-based mapping rules for matching input data queries from one of the plurality of requesting sources to an associated one of the plurality of reference databases;
means for finding a matching reference database record;

means for applying at least one transformation rule to convert the matching reference database record to a plurality of forms, wherein individual ones of the plurality of forms correspond to individual target databases of a plurality of target databases;

means for querying at least one of the plurality of target databases for one or more target database records that correspond to the at least one of the individual ones of the plurality of forms; and means for retrieving corresponding records comprising target database records that correspond to the at least one of the individual ones of the plurality of forms and transferring the corresponding records to the requesting source.

13. The apparatus of claim 12 further comprising:

means for determining whether a possibly matching record can be considered a near-matching record to the input data, in response to failing to find a matching reference database record but finding one or more possibly matching reference database records; and means for applying at least one transformation rule to convert the near-matching reference database record to a plurality of forms, wherein individual ones of the plurality of forms correspond to individual target databases of a plurality of target databases;

means for querying at least one of the plurality of target databases for the one or more target database records that correspond to the at least one of the individual ones of the plurality of forms, in response to identifying a near-matching record.

14. The apparatus of claim 12 further comprising:

means for determining whether a possibly matching record can be considered a near-matching record to the input data, in response to failing to find a matching reference database record but finding one or more possibly matching reference database records; and means for applying at least one transformation rule to convert the chosen reference database record to a plurality of forms, wherein individual ones of the plurality of forms correspond to individual target databases of a plurality of target databases;

means for querying at least one of the plurality of target databases for the one or more target database record that corresponds to the at least one of the individual ones of the plurality of forms, in response to failing to identify a near-matching record, generating a selection request to choose from among the one or more possibly matching records a record that corresponds to the input data and in response to selection of a chosen record from among the one or more possibly matching records.

15. The apparatus of claim 12, wherein the means for applying at least one transformation rule converts the matching reference database record to match individual format rules of at least one of the plurality of target databases.

16. A non-transitory computer-readable storage medium having stored thereon computer-executable instructions that are configured to, in response to execution by a processing device, cause a computing system to perform operations comprising:

receive input data having an input data type from one of a plurality of requesting sources, wherein a first input data query from a first requesting source has a form different from a second input data query from a second requesting source;

based on the input data type, select from a plurality of reference databases at least one reference database containing validated data;

query the at least one reference database for a reference database record that matches the input data by seeking a reference database record by applying a set of reference-based mapping rules for matching input data queries from one of the plurality of requesting sources to an associated one of the plurality of reference databases;

in response to finding a matching reference database record, apply at least one transformation rule to convert the matching reference database record to a plurality of forms, wherein individual ones of the plurality of forms correspond to individual target databases of a plurality of target databases, and query using at least one of the individual ones of the plurality of forms at least one of a plurality of target databases for one or more target database records that correspond to the reference database record; and retrieve target database records that correspond to the matching reference database record.

17. The non-transitory computer-readable storage medium of claim 16, wherein the computer-executable instructions further comprise instructions configured to cause the computing system to generate a request to select from among one or more possibly matching reference database records.

18. The non-transitory computer-readable storage medium of claim 16, wherein the application of the at least one transformation rule converts the matching reference database record to match individual format rules of at least one of the plurality of target databases.

* * * * *

UNITED STATES PATENT AND TRADEMARK OFFICE
CERTIFICATE OF CORRECTION

PATENT NO. : 8,346,794 B2  
APPLICATION NO. : 12/849522  
DATED : January 1, 2013  
INVENTOR(S) : Cheng et al.

Page 1 of 1

It is certified that error appears in the above-identified patent and that said Letters Patent is hereby corrected as shown below:

On the Title Page, in Item (54), and in the specification, Column 1, Lines 1-7, in Title: delete "METHOD AND APPARATUS FOR QUERYING TARGET DATABASES USING REFERENCE DATABASE RECORDS BY APPLYING A SET OF REFERENCE-BASED MAPPING RULES FOR MATCHING INPUT DATA QUERIES FROM ONE OF THE PLURALITY OF SOURCES" and
insert -- QUERYING TARGET DATABASES USING INPUT-RELATED REFERENCE DATABASE --, therefor.

Title Page 2, in Item (56), under "OTHER PUBLICATIONS", in Column 2, Line 7, delete "PCT/US05109860" and insert -- PCT/US05/09860 --, therefor.

Title Page 2, in Item (56), under "OTHER PUBLICATIONS", in Column 2, Lines 13-14, delete "pp. 2007-215, 2002. c_Springer-Verlag" and
insert -- pp. 207-215, 2002. © Springer-Verlag --, therefor.

Title Page 2, in Item (56), under "OTHER PUBLICATIONS", in Column 2, Line 19, delete "EPCt" and insert -- EPC --, therefor.

In the Specifications:

In Column 10, Line 3, delete "near-marching" and insert -- near-matching --, therefor.

In the Claims:

In Column 12, Line 21, in Claim 4, delete "1" and insert -- 1, --, therefor.

In Column 14, Line 6, in Claim 9, delete "8" and insert -- 8, --, therefor.

Signed and Sealed this
Ninth Day of July, 2013

Teresa Stanek Rea
*Acting Director of the United States Patent and Trademark Office*